(12) United States Patent
Wang et al.

(10) Patent No.: US 11,307,445 B2
(45) Date of Patent: Apr. 19, 2022

(54) DISPLAY DEVICE AND MANUFACTURING METHOD THEREOF

(71) Applicant: Anhui Hongcheng Opto-Electronics Co., Ltd., Bengbu (CN)

(72) Inventors: Xukai Wang, Bengbu (CN); Donggui Li, Bengbu (CN); Tingfeng Chen, Bengbu (CN)

(73) Assignee: Anhui Hongcheng Opto-Electronics Co., Ltd., Bengbu (CN)

( * ) Notice: Subject to any disclaimer, the term of this patent is extended or adjusted under 35 U.S.C. 154(b) by 0 days.

(21) Appl. No.: 17/121,407

(22) Filed: Dec. 14, 2020

(65) Prior Publication Data

US 2022/0091458 A1 Mar. 24, 2022

(30) Foreign Application Priority Data

Sep. 18, 2020 (CN) .......................... 202010988558.0

(51) Int. Cl.
*G02F 1/1333* (2006.01)
*G02F 1/13357* (2006.01)

(52) U.S. Cl.
CPC .. *G02F 1/133325* (2021.01); *G02F 1/133311* (2021.01); *G02F 1/133317* (2021.01); *G02F 1/133322* (2021.01); *G02F 1/133331* (2021.01); *G02F 1/133608* (2013.01); *G02F 2201/46* (2013.01); *G02F 2202/28* (2013.01)

(58) Field of Classification Search
CPC ......... G02F 1/133311; G02F 1/133317; G02F 1/133322

See application file for complete search history.

(56) References Cited

U.S. PATENT DOCUMENTS

| | | | | |
|---|---|---|---|---|
| 9,807,891 B2* | 10/2017 | Tsukahara | .......... | G02F 1/133308 |
| 2010/0188597 A1* | 7/2010 | Koike | ............... | G02F 1/133308 349/58 |
| 2010/0328927 A1* | 12/2010 | Huang | .............. | G02F 1/133606 362/97.1 |
| 2012/0314155 A1* | 12/2012 | Lo | .......................... | G06F 1/1637 211/26 |
| 2013/0128180 A1* | 5/2013 | Zhou | ........................ | H05K 5/02 349/58 |
| 2014/0226103 A1* | 8/2014 | Zhuang | ............. | G02F 1/133308 349/58 |
| 2016/0209697 A1* | 7/2016 | Chang | .................. | G02B 6/4261 |

FOREIGN PATENT DOCUMENTS

CN 209248949 U 8/2019

* cited by examiner

*Primary Examiner* — Evan P Dzierzynski

(57) ABSTRACT

The present disclosure relates to a display device and manufacturing method thereof. The display device includes a display area and a non-display area located on a periphery of the display area. The display device includes a cover, a display panel and a middle frame assembly. The cover comprises a cover plate and adapters. The adapters are disposed on a side surface of the cover plate corresponding to the non-display area. More than two adapters are disposed at intervals along the periphery of the display area. The display panel is disposed on the cover plate to correspond to the display area, and the display panel and the adapters are located on the same side. The middle frame assembly is connected to the cover via the adapters. The middle frame assembly and the cover together form an accommodation space to accommodate the display panel.

20 Claims, 9 Drawing Sheets

DISPLAY DEVICE AND MANUFACTURING METHOD THEREOF

CROSS-REFERENCE TO RELATED APPLICATION

This application claims priority to Chinese Patent Application No. 202010988558.0, filed on Sep. 18, 2020, which is hereby incorporated by reference in its entirety.

TECHNICAL FIELD

The present disclosure relates to a technical field of a display device, in particular to a display device and a manufacturing method thereof.

BACKGROUND

With a development and progress of a display technology, various types of display devices have appeared. The display device is used for optical processing to form a display image with multiple colors in a display area. The display device can be applied to an audio-visual education system in a multimedia classroom. The display device includes a display panel and a cover plate. The cover plate is disposed on a light-emitting surface of the display panel to protect the display panel. In prior art, during a use process of the display device, a structural damage, such as a crack or deformation, appears in a non-display area of the cover plate of the display device, which will adversely affect the use process of the display device.

SUMMARY

The present disclosure provides a display device and a manufacturing method thereof. A possibility of cracks or deformation of the cover plate can be reduced in the display device.

In an aspect, the present disclosure provides a display device. The display device comprises a display area and a non-display area located on a periphery of the display area. The display device comprises a cover, a display panel and a middle frame assembly. The cover comprises a cover plate and adapters. The adapters are disposed on a side surface of the cover plate corresponding to the non-display area. More than two adapters are disposed at intervals along the periphery of the display area. The display panel is disposed on the cover plate to correspond to the display area, and the display panel and the adapters are located on the same side. The middle frame assembly is connected to the cover via the adapters. The middle frame assembly and the cover together form an accommodation space to accommodate the display panel.

According to an embodiment of the present disclosure, the display device further comprises a fastener, each of the adapters comprises a connecting portion and a cantilever portion, the connecting portion is connected to the side surface, and the fastener locks the cantilever portion and the middle frame assembly.

According to an embodiment of the present disclosure, the cantilever portion extends toward the display panel, and an accommodation gap is formed between the cantilever portion and the cover plate.

According to an embodiment of the present disclosure, the cantilever portion is disposed on an edge of the connecting portion away from the display panel, and the cantilever portion is folded toward the middle frame assembly relative to the connecting portion and is located on an outside of the middle frame assembly.

According to an embodiment of the present disclosure, the display device further comprises a backlight assembly connected to the middle frame assembly, the middle frame assembly comprises a first extension portion located inside the cantilever portion, the backlight assembly comprises a second extension portion located inside the first extension portion, and the fastener locks the cantilever portion, the first extension portion and the second extension portion.

According to an embodiment of the present disclosure, one of each of the adapters and the middle frame assembly comprises a limiting groove extending along a thickness direction of the cover plate, the other comprises a limiting protrusion extending along the thickness direction, and the limiting protrusion is inserted and fitted into the limiting groove.

According to an embodiment of the present disclosure, the display device further comprises a flexible sealing pad disposed between the middle frame assembly and a portion of the cover plate corresponding to the non-display area. Or, the display device further comprises an outer frame assembly, the adapters are located inside the outer frame assembly, and the flexible sealing pad is disposed between the outer frame assembly and a portion of the cover plate corresponding to the non-display area.

According to an embodiment of the present disclosure, the cover plate comprises four frames, two frames opposed to each other form a group of frames, and at least one group of frames is provided with the adapters.

According to the display device according to the embodiment of the present disclosure, more than two adapters are provided on the cover plate so that the middle frame assembly can be connected to the cover via the adapters. More than two adapters are disposed on an edge area of the cover plate beyond the display panel and are disposed at intervals along a periphery of the display panel. The cover plate and the middle frame assembly are connected and fixed via more than two adapters, thereby reducing an connection area between a part of the cover plate corresponding to the non-display area and the middle frame assembly, and reducing a constrain on a part of the cover plate corresponding non-display area applied by the middle frame assembly. In this way, on the one hand, when there is uneven force applied on a part of the cover plate corresponding to the non-display area, since a part of the cover plate between two adapters is not restricted, an internal stress of the part the cover plate corresponding to the non-display area can be buffered or released by the unconstrained part, reducing a problem of a crack or deformation of the cover plate. On the other hand, when the part of the cover located between the two adapters are uneven, a concave part and a convex part are not restricted, so that the internal stress is not likely to be excessively concentrated, and the problem of a crack or deformation of the cover plate is reduced.

In another aspect, the present disclosure provides a method for manufacturing a display device comprising:
  connecting closely a display panel and a cover plate;
  along a peripheral direction of the display panel, more than two adapters are disposed at intervals on an edge area of the cover plate beyond the display panel, and the adapters and the display panel are located on the same side of the cover plate;
  connecting a middle frame assembly and the adapters.

According to an embodiment of the present disclosure, in the following step that along the peripheral direction of the display panel more than two adapters are disposed at intervals on the edge area of the cover plate beyond the display panel and the adapters and the display panel are located on the same side of the cover plate, the adapters are adhered to the edge area.

BRIEF DESCRIPTION OF THE DRAWINGS

Features, advantages, and technical effects of exemplary embodiments of the present disclosure will be described below with reference to the drawings.

Figure 1:
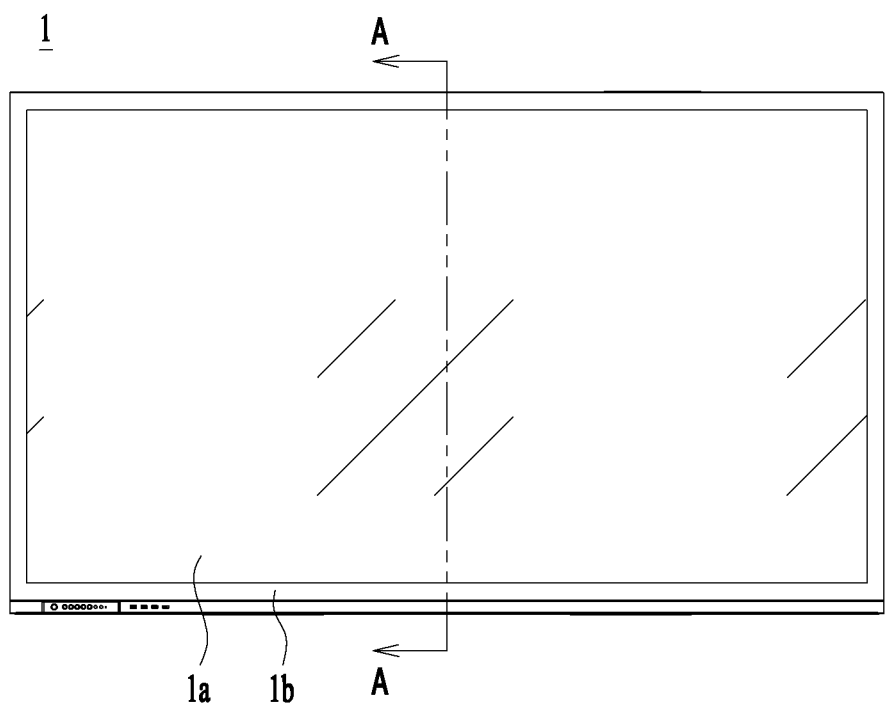
FIG. 1 is a schematic structural diagram of a display device disclosed in an embodiment of the present disclosure.

In the drawings, the drawing may not be drawn to actual scale.

DESCRIPTION OF REFERENCE SIGNS 1. display device; 1*a*, display area; 1*b*, non-display area;
10. cover; 11, cover plate; 11*a*, side surface; 111, frame; 12, adapter; 121, connecting part; 122, cantilever part;
20. display panel;
30. middle frame assembly; 31. first extension part;
40. fastener;
50. backlight assembly; 51. second extension part;
60. flexible sealing pad;
70. outer frame assembly;
100. accommodation gap;
200. gap;
300. limiting groove;
400. limiting protrusion;
X, thickness direction.

DETAILED DESCRIPTION

Implementing ways of the present disclosure will be described in further detail below in conjunction with drawings and embodiments. Detailed description and drawings of following embodiments are used to illustrate a principle of the present disclosure, and cannot be used to limit the scope of the present disclosure. That is, the present disclosure is not limited to embodiments described.

In the description of the present disclosure, it should be noted that, unless otherwise specified, the term "a plurality of . . . " and the like mean two or more; the terms "upper", "lower", "left", "right", "inner", "outer" and other terms indicating orientations or positional relationship is only for convenience of describing the present disclosure and simplifying a description, rather than indicating or implying that a device or element referred to must have a specific orientation, be constructed and operated in a specific orientation, and therefore cannot be understood as a limitation to the present disclosure. In addition, the terms "first", "second", "third", etc. are only used for descriptive purposes, and cannot be understood as indicating or implying relative importance. The term "vertical" is not strictly vertical, but within an allowable range of error. The term "parallel" is not strictly parallel, but within an allowable range of error.

Orientation words appearing in the following description are all directions shown in the drawings, and do not limit a specific structure of the present disclosure. In the description of the present disclosure, it should also be noted that, unless otherwise clearly specified and limited, the terms "installation", "connection", and "connecting" should be understood in a broad sense. For example, it may be a fixed connection or a detached connection or an integral connection; it can be a direct connection or indirect connection via an intermediate medium. For those of ordinary skill in the art, a specific meaning of the above-mentioned terms in the present disclosure can be understood according to specific circumstances.

The applicant noticed a structural damage, such as a crack or deformation, appears in a cover plate of an existing display device, and thus a research and analysis on various structures of the display device is conducted. The applicant found that in a non-display area of the existing display device, a cover plate is adhered to a middle frame assembly via adhesive glue. As a part of the cover plate located in the non-display area is all adhered to the middle frame assembly, when the part of the cover plate corresponding to the non-display area is uneven, a concave part facing the middle frame assembly will bear compressive stress, while a convex part protruding in a direction away from the middle frame assembly will bear tensile stress, so that there will be uneven force in the uneven area, which will lead to a problem of a crack or deformation in some areas of the cover plate due to stress concentration. After further research and analysis, the applicant found that since an edge area of the cover plate located in the non-display area is adhered to the middle frame assembly, the edge area of the cover plate includes a large adhered area. It is not easy to buffer or release an internal stress under stress. This can cause a crack or deformation.

Based on the above-mentioned problem discovered by the applicant, the applicant improves a structure of the display device, and embodiments of the present disclosure will be further described below.

In order to better understand the present disclosure, embodiments of the present disclosure will be described below with reference to FIGS. 1 to 12.

FIG. 1 schematically shows a front structure of a display device 1 according to an embodiment. Referring to FIG. 1, the display device 1 of the embodiment of the present disclosure includes a display area 1*a* and a non-display area 1*b* located on a periphery of the display area 1*a*. The display area 1*a* is used to display visual images, and can also be used as a user touch control area.

Figure 2:
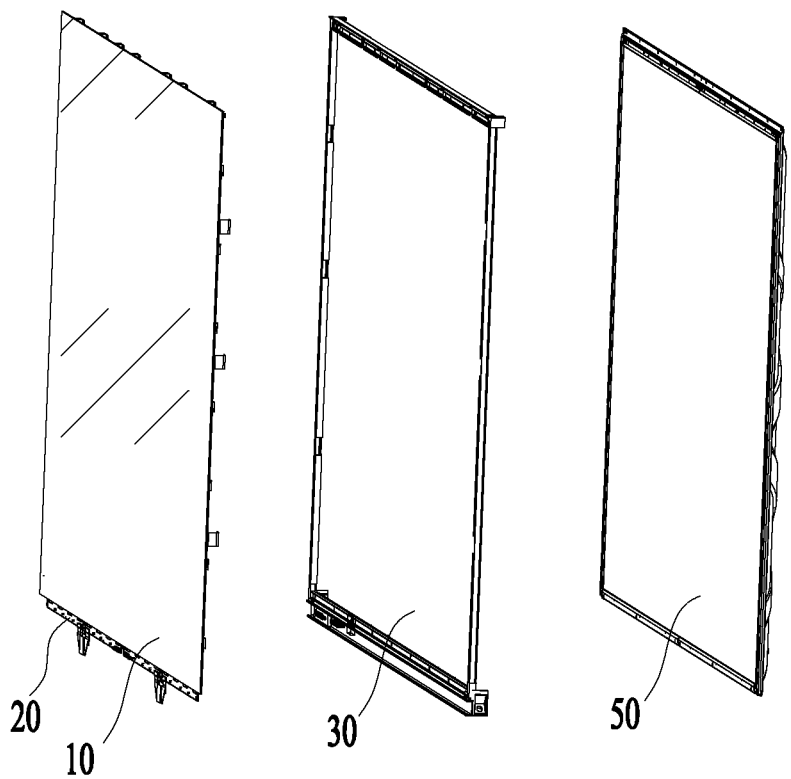
FIG. 2 is a schematic exploded structural diagram of the display device of the embodiment shown in FIG. 1.

FIG. 2 schematically shows an exploded structure of the display device 1 of the embodiment shown in FIG. 1. The display device 1 of the embodiment of the present disclosure includes a cover 10, a display panel 20, a middle frame assembly 30, and a backlight assembly 50. An accommodation space is formed between the cover 10 and the middle frame assembly 30. The accommodation space is used to accommodate the display panel 20. The display panel 20 corresponds to the display area 1a, and is used for displaying visual images or performing touch manipulation. The backlight assembly 50 is used to provide a light source for the display panel 20. The display panel 20 of the embodiment may include a touch control layer, a color filter substrate, a liquid crystal layer, and an array substrate. In some other embodiments, the display device 1 may not be provided with the backlight assembly 50, and the display device 1 adopts a form of a self-luminous unit, so that the display panel 20 can display a visual image. A manner of displaying images of the display panel 20 and a selection of light sources are not limited here.

Figure 3:
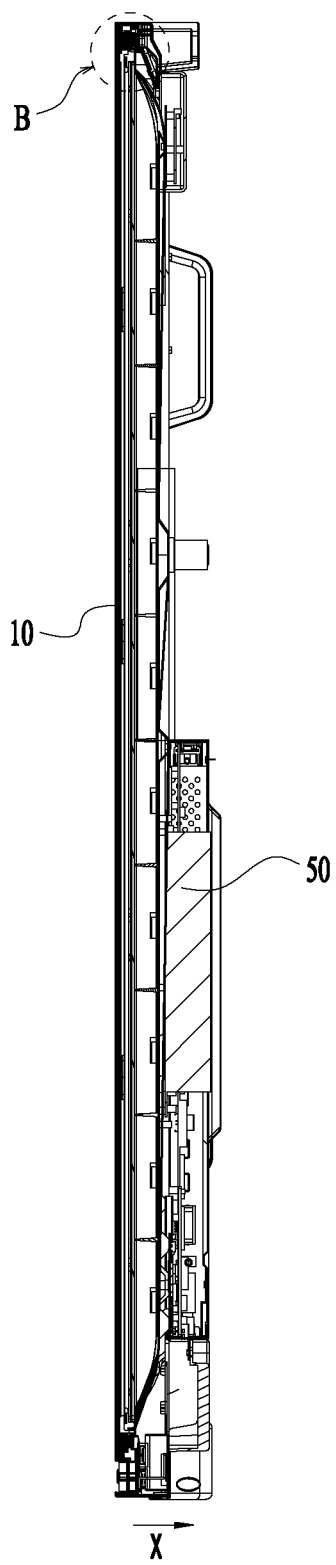
FIG. 3 is a schematic sectional structural diagram taken along a A-A direction in FIG. 1.

FIG. 3 schematically shows a sectional structure taken along an A-A direction of the display device 1 in the embodiment shown in FIG. 1. Referring to FIG. 3, along a thickness direction X, the cover 10, the display panel 20 (not shown in the figure), the middle frame assembly 30 (not shown in the figure) and the backlight assembly 50 are disposed in a stacked manner. The backlight assembly 50 is located on a side of the cover 10. The cover 10 is connected with the middle frame assembly 30, and the backlight assembly 50 is connected with the middle frame assembly 30. The middle frame assembly 30 can support the backlight assembly 50 and the cover 10.

Figure 4:
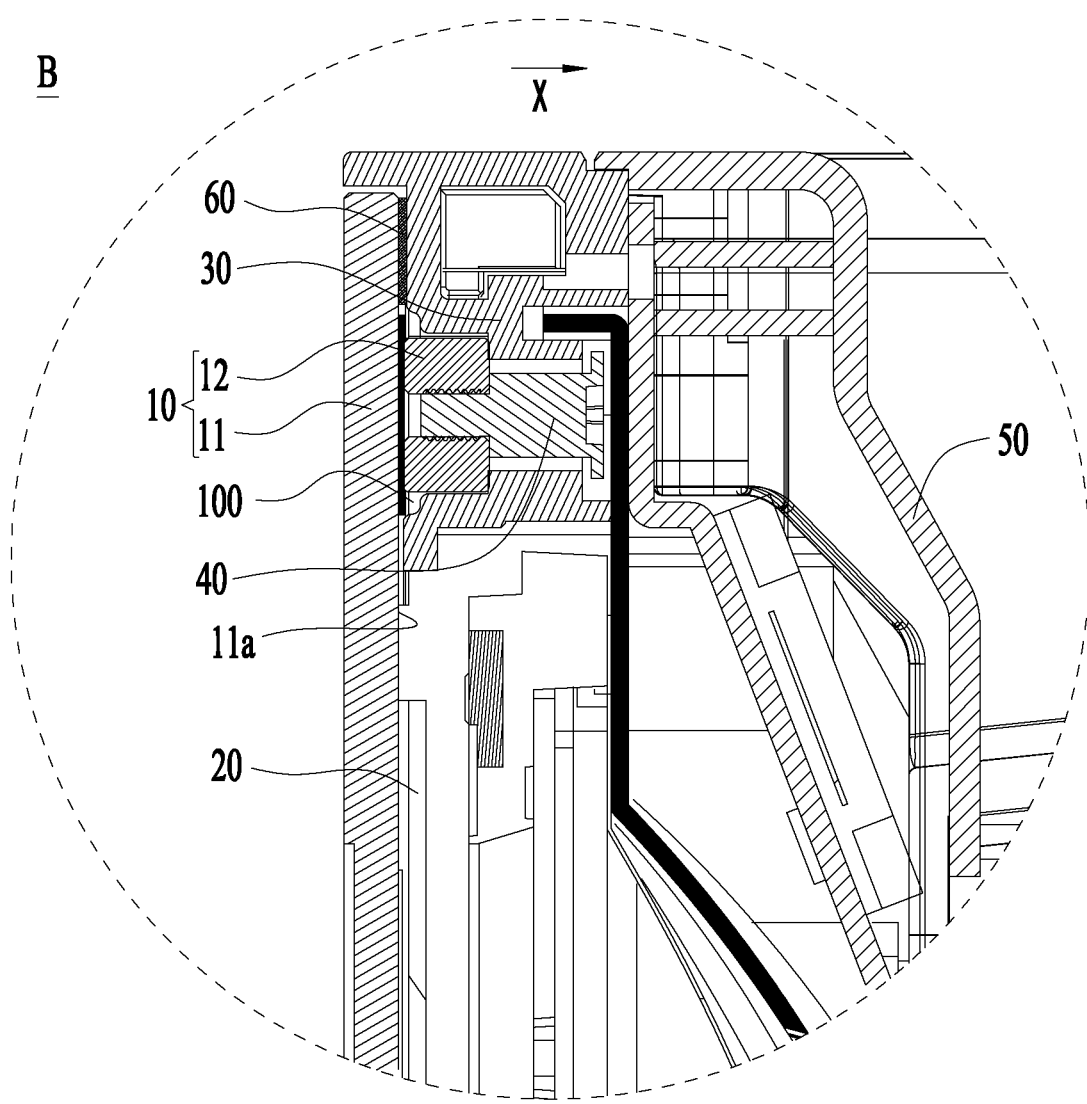
FIG. 4 is an enlarged schematic diagram of a part B in FIG. 3.

FIG. 4 schematically shows an enlarged view of a part B in FIG. 3. Referring to FIG. 4, the cover 10 includes a cover plate 11 and an adapter 12. The cover plate 11 includes a side surface 11a facing the middle frame assembly 30 and corresponding to the non-display area 1b. The adapter 12 is disposed on the side surface 11a. The display panel 20 and the adapter 12 are located on the same side of the cover plate 11. The middle frame assembly 30 is connected to the cover plate 11 via the adapter 12. In an example, the cover plate 11 is in transparent structure, and a material of the cover plate 11 may be glass or plastic.

Figure 5:
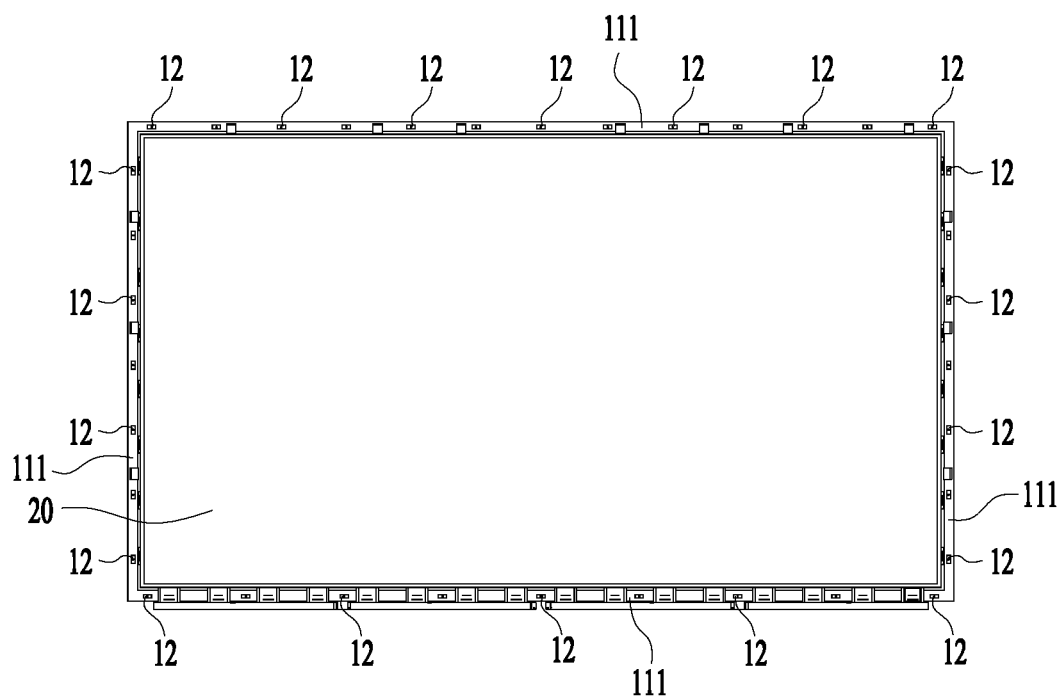
FIG. 5 is a schematic structural diagram of a cover disclosed in an embodiment of the present disclosure.

FIG. 5 schematically shows a structure of the cover 10 of an embodiment. As shown in FIG. 5, more than two adapters 12 are arranged at intervals along a periphery of the display area 1a. In the embodiment, the cover plate 11 includes a frame 111 corresponding to the non-display area 1b. In an example, the cover plate 11 includes four frames 111. The two frames 111 opposed to each other form a group of frames 111. Two groups of frames 111 are provided with adapters 12. Understandably, in some other embodiments, the adapters 12 may be provided on only one group of frames 111.

In the display device 1 of the embodiment of the present invention, more than two adapters 12 are provided on the cover plate 11, and the middle frame assembly 30 is connected to the cover 10 via the adapters 12. Since the adapters 12 are disposed at intervals, after the cover plate 11 and the middle frame assembly 30 are connected, an area on the cover plate 11 between two adjacent adapters 12 is not easily restricted by the middle frame assembly 30. Therefore, even if the area on the cover plate 11 between two adjacent adapters 12 is not uniformly stressed, an internal stress of the cover plate 11 will be buffered or released, which is beneficial to reduce a possibility of a crack or deformation appearing on the cover plate 11 caused by an internal stress of the cover plate 11 not able of be buffered or released as a full and close connection between the middle frame assembly 30 and the cover plate 11. Also, the adapters 12 will not easily separate and fall off from the middle frame assembly 30 due to a long-term action of the internal stress of the cover plate 11, which will further help prolong a service life of the display device 1, help improve a structural integrity of the cover plate 11 during long-term use, and reduce maintenance and loss costs. In addition, the adapters 12 can occupy a small area on the cover plate 11, thereby reducing an area of a screen printing ink on a portion of the cover plate 11 corresponding to the non-display area 1b to achieve a narrow frame or full screen display effect of the display device 1. Furthermore, since the middle frame assembly 30 and the adapters 12 are easy to be disassembled and assembled, the middle frame assembly 30 and the adapters 12 can be easily separated in a later maintenance or repair process, which reduces a difficulty of maintenance and improves a maintenance friendliness.

In one embodiment, referring to FIG. 4, the adapter 12 and the cover plate 11 are adhesively connected. The adhering method can reduce a structural design complexity of the cover plate 11 and the adapter 12, which is beneficial to simplify a processing procedure of the cover plate 11 and the adapter 12, thereby reducing a processing difficulty of the cover plate 11 and the adapter 12. In addition, the adhering method can reduce a difficulty of a connection operation and reduce a possibility of the adapter 12 scratching the screen printing ink on the cover plate 11 during a connection process. In one example, adhesive glue or adhesive tape is applied to the cover plate 11, and then the adapter 12 are adhered to the adhesive glue or adhesive tape to complete a connection and fixation of the adapter 12 and the cover plate 11. In one example, the adapter 12 may be of a rectangular structure. A length of the adapter 12 may be 14 mm to 30 mm, and a width may be 6 mm to 15 mm. A thickness of an adhesive layer formed by the adhesive glue or adhesive tape is 0.15 mm to 0.35 mm.

In one embodiment, a material of the adapters 12 may be aluminum or aluminum alloy, so that the adapters 12 have good strength while maintaining light weight, and the adapters 12 have good workability. In some other embodiments, a material of the adapters 12 may also be plastic.

In one embodiment, referring to FIG. 4, the display device 1 further includes a flexible sealing pad 60. The flexible sealing pad 60 is provided between a portion of the middle frame assembly 30 and a portion of the cover plate 11 corresponding to the non-display area 1b. The flexible pad 60 has compressibility and good resilience. The flexible pad 60 can isolate the middle frame assembly 30 and the cover plate 11, and reduce a possibility of the middle frame assembly 30 scratching the screen printing ink of the cover plate 11 when the middle frame assembly 30 and the cover body 10 are assembled. It is also beneficial to reduce a possibility of external substances (such as dust or water vapor) entering an interior of the display device 1 from between the middle frame assembly 30 and the cover plate 11. In one example, the flexible pad 60 may be cushion foam.

In one embodiment, as shown in FIG. 4, there is an accommodation gap 100 between the middle frame assembly 30 and the cover plate 11. In the embodiment in which the adapter 12 and the cover plate 11 are connected by adhesive glue, the accommodation gap 100 can be used to accommodate the adhesive glue overflowing between the adapter 12 and the cover plate 11 to reduce a possibility that the middle frame assembly 30 is not easily disassembled as the middle frame assembly 30 is adhered due to a contact between the adhesive glue and the middle frame assembly 30. In an example, the accommodating gap 100 is an annular space surrounding the adapter 12.

In one embodiment, referring to FIG. 4, the display device 1 further includes a fastener 40. The fastener 40 locks the adapter 12 and the middle frame assembly 30. After the cover 10 and the middle frame assembly 30 are assembled, the fastener 40 can be used to lock the adapter 12 and the middle frame assembly 30 to improve stability and reliability of a connection between the cover 10 and the middle frame assembly 30. In one example, the fastener 40 and the adapter 12 are connected by a threaded connection to achieve locking, so that when the middle frame assembly 30 and the cover 10 need to be separated or locked, the fastener 40 can be easily disassembled and assembled. In one example, the middle frame assembly 30 includes a recess extending in a thickness direction X and a mounting hole communicating with the recess. At least part of the adapter 12 is located in the recess. The adapter 12 includes a threaded hole corresponding to the mounting hole. The fastener 40 may be a stepped screw, in which a section with a smaller diameter is a threaded section. The fastener 40 passes through the mounting hole and is threadedly connected with the threaded hole of the adapter 12. In the thickness direction X, an adjustment gap is reserved between a nut of the fastener 40 and the middle frame assembly 30, so that the cover 10 has an amount of movement along the thickness direction X, which reduces a possibility that the adhesive layer between the adapter 12 and the cover plate 11 and the screen printing ink on the cover plate 11 are under tension for a long time after a locking of the fastener 40 and thus reduces a possibility that the screen printing ink peels off and the adhesive layer is separated from the cover plate 11 or the adhesive layer is separated from the adapter 12 which results the cover plate 11 falling off. In an example, a material of the adapter 12 may be aluminum or aluminum alloy. Alternatively, the adapter 12 includes a plastic body and a nut embedded in the plastic body. The fastener 40 is threadedly connected with the nut. In another example, the fastener 40 and the adapter 12 can be locked by a snap connection. The fastener 40 includes a snap structure, and the adapter 12 includes a snap groove. The snap of the fastener 40 can be clamped in the groove of the adapter 12 to realize a connection and fixation between the fastener 40 and the adapter 12, and the fastener 40 locks the adapter 12 and the middle frame assembly 30.

Figure 6:
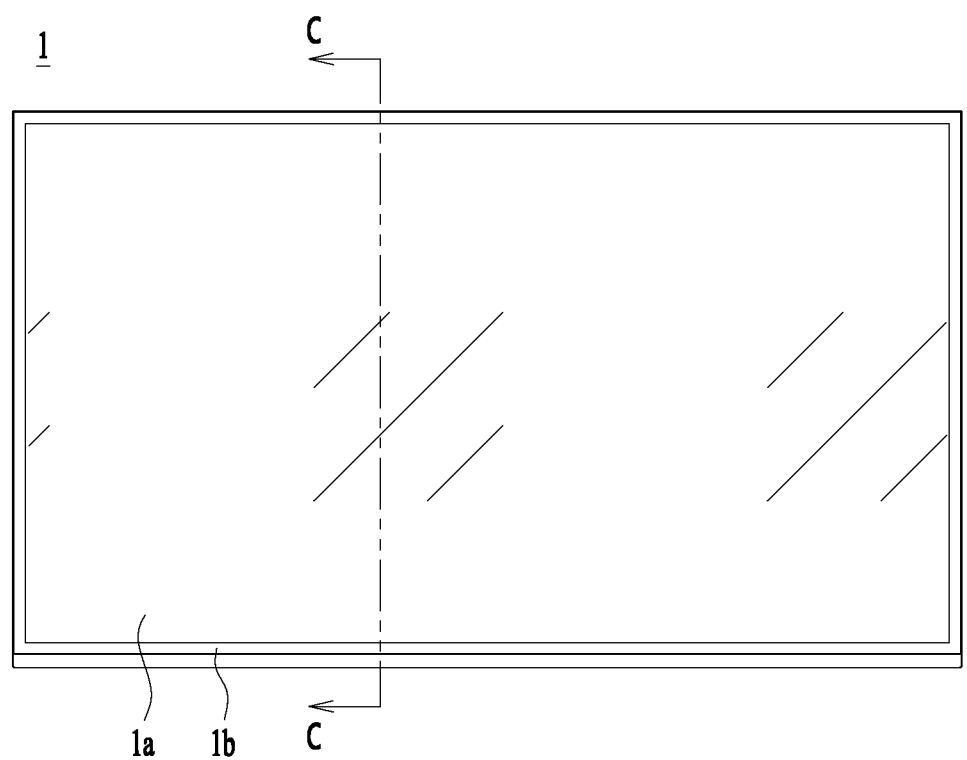
FIG. 6 is a schematic structural diagram of a display device disclosed in another embodiment of the present disclosure.
Figure 7:
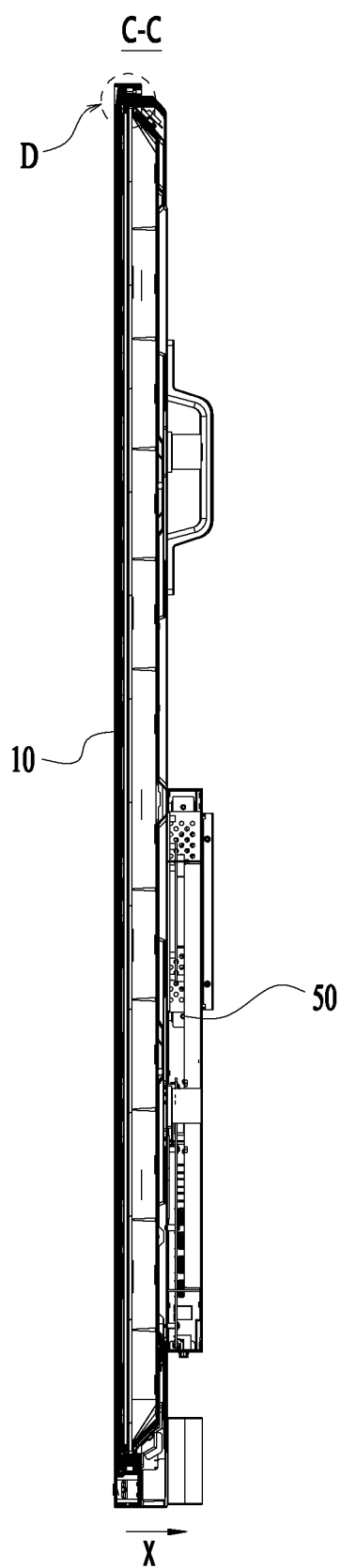
FIG. 7 is a schematic sectional structural diagram taken along a C-C direction in FIG. 6.
Figure 8:
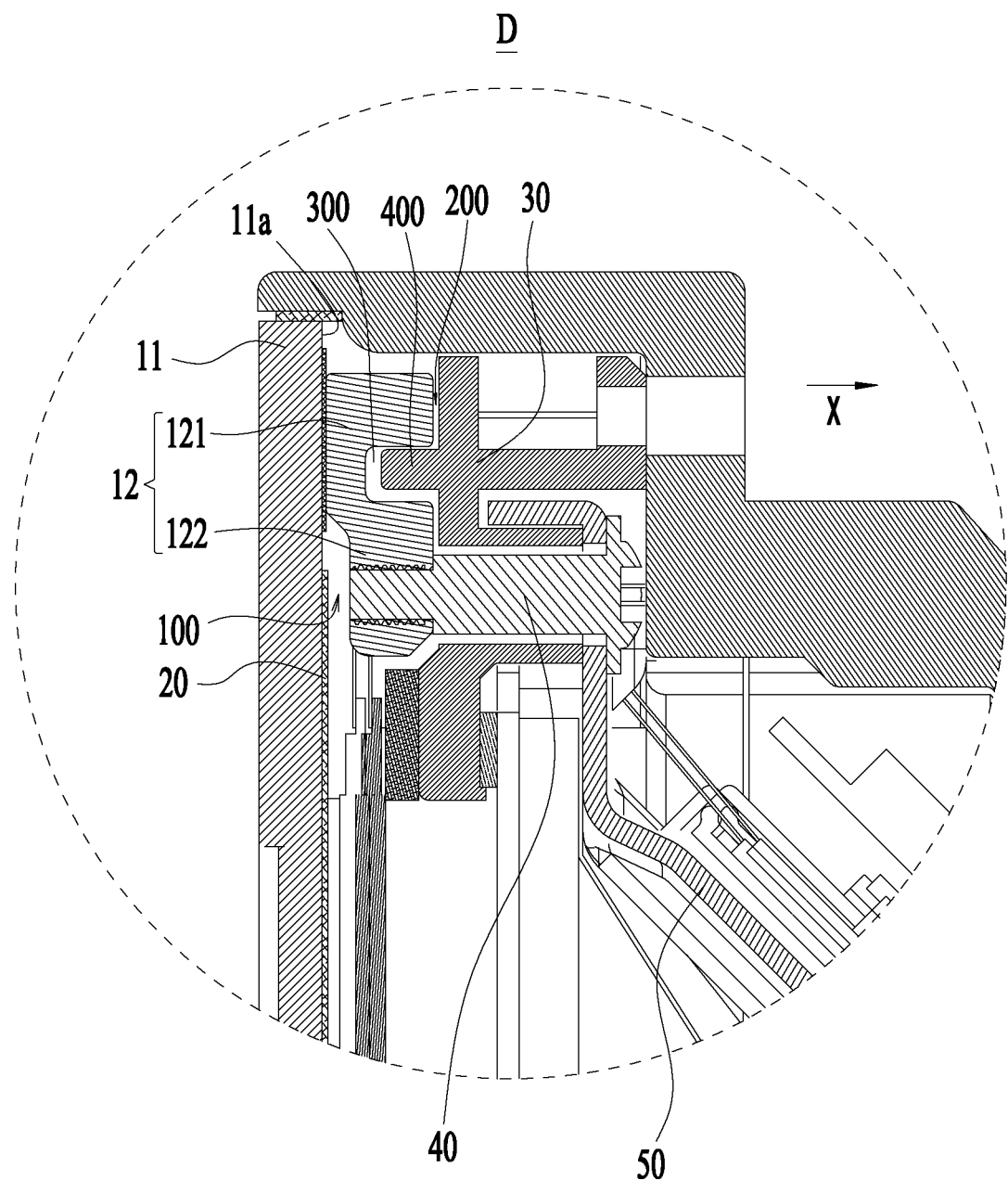
FIG. 8 is an enlarged schematic diagram of a part D in FIG. 7.

FIG. 6 schematically shows a front structure of the display device 1 according to another embodiment of the present disclosure. FIG. 7 schematically shows a sectional structure taken along a C-C direction in FIG. 6. FIG. 8 schematically shows an enlarged diagram of a part D in FIG. 7.

In an embodiment, referring to FIG. 8, a structure in this embodiment that is the same as that of the embodiment shown in FIG. 1 will not be repeated, and please refer to the above-mentioned embodiment. The differences are mainly described in this embodiment. The adapter 12 of this embodiment includes a connecting portion 121 and a cantilever portion 122. The connecting portion 121 and the cantilever portion 122 are connected to each other. The adapter 12 is connected to the side surface 11a of the cover plate 11 via the connecting portion 121. The fastener 40 locks the cantilever portion 122 and the middle frame assembly 30. In an example, the connecting portion 121 and the cantilever portion 122 are integrally formed. The adapter 12 can be connected more flexibly to different positions of the middle frame assembly 30 via the cantilever portion 122, thereby improving a flexibility of a connection position selection and a flexibility of a connection position structural design of the middle frame assembly 30 and the adapter 12. Also, it is beneficial to optimize a utilization of internal space of the display device 1 and ensure a compactness of an overall structure.

Continuing to refer to FIG. 8, the cantilever portion 122 is disposed on an edge of the connecting portion 121 close to the display panel 20. The cantilever portion 122 extends from the connecting portion 121 toward the display panel 20. The accommodation gap 100 is formed between the cantilever portion 122 and the cover plate 11. In the embodiment in which the adapter 12 and the cover plate 11 are connected by the adhesive glue, the accommodation gap 100 can be used to accommodate the adhesive glue overflowing between the adapter 12 and the cover plate 11 to reduce a possibility that the middle frame assembly 30 or the fastener 40 is not easily disassembled as the middle frame assembly 30 or the fastener 40 is adhered due to a contact between the adhesive glue and the middle frame assembly 30 or the fastener 40. In addition, the accommodation gap 100 can avoid the display panel 20, so that while a compactness of the internal structure of the display device 1 is improved, the adapter 12 will not easily interfere with the display panel 20. In an example, there is a gap between an edge area of the cantilever portion 122 away from the connecting portion 121 and the middle frame assembly 30 to avoid positional interference between the cantilever portion 122 of the adapter 12 and the middle frame assembly 30. In an example, the connecting portion 121 is in a rectangular structure, and the cantilever portion 122 is also in a rectangular structure.

In one embodiment, as shown in FIG. 8, in the thickness direction X, there is a gap 200 between the adapter 12 and the middle frame assembly 30, so that the cover 10 has an amount of movement in the thickness direction X, which reduces a possibility that the adhesive layer between the adapter 12 and the cover plate 11 and the screen printing ink on the cover plate 11 are under tension for a long time after a locking of the fastener 40 and thus reduces a possibility that the screen printing ink peels off and the adhesive layer is separated from the cover plate 11 or the adhesive layer is separated from the adapter 12 which results the cover plate 11 falling off.

In an embodiment, referring to FIG. 8, the adapter 12 includes a limiting groove 300 extending along the thickness direction X. The limiting groove 300 includes an opening on a surface of the adapter 12 facing away from the cover plate 11. The middle frame assembly 30 includes a limiting protrusion 400 extending and protruding along the thickness direction X. The limiting protrusion 400 is inserted and fitted into the limiting groove 300. When the cover 10 and the middle frame assembly 30 are assembled, the limiting protrusion 400 can be inserted into the limiting groove 300 to complete a positioning and limiting of the middle frame assembly 30, so as to ensure that the middle frame assembly 30 is positioned quickly and accurately at a predetermined position. Then the middle frame assembly 30 and the cantilever portion 122 are locked via the fastener 40. In an example, the limiting groove 300 is correspondingly disposed on the connecting portion 121 of the adapter 12. In another example, the adapter 12 includes the limiting protrusion 400, and the middle frame assembly 30 includes the limiting groove 300. The positioning and limiting of the middle frame assembly 30 can also be achieved by the limiting protrusion 400 and the limiting groove 300.

In an embodiment, referring to FIG. 8, an edge portion of the backlight assembly 50 is clamped with the middle frame assembly 30. An edge of the backlight assembly 50 includes a through hole, and the middle frame assembly 30 is also provided with a mounting hole communicating with the through hole. A threaded hole is provided on the cantilever portion 122 corresponding to the through hole of the middle frame assembly 30. A rod of the fastener 40 passes through the through hole and the mounting hole, and then is screwed with the threaded hole. A cap end of the fastener 40 overlaps the edge of the backlight assembly 50. The fastener 40 secures the backlight assembly 50, the middle frame assembly 30 and the cantilever portion 122.

Figure 9:
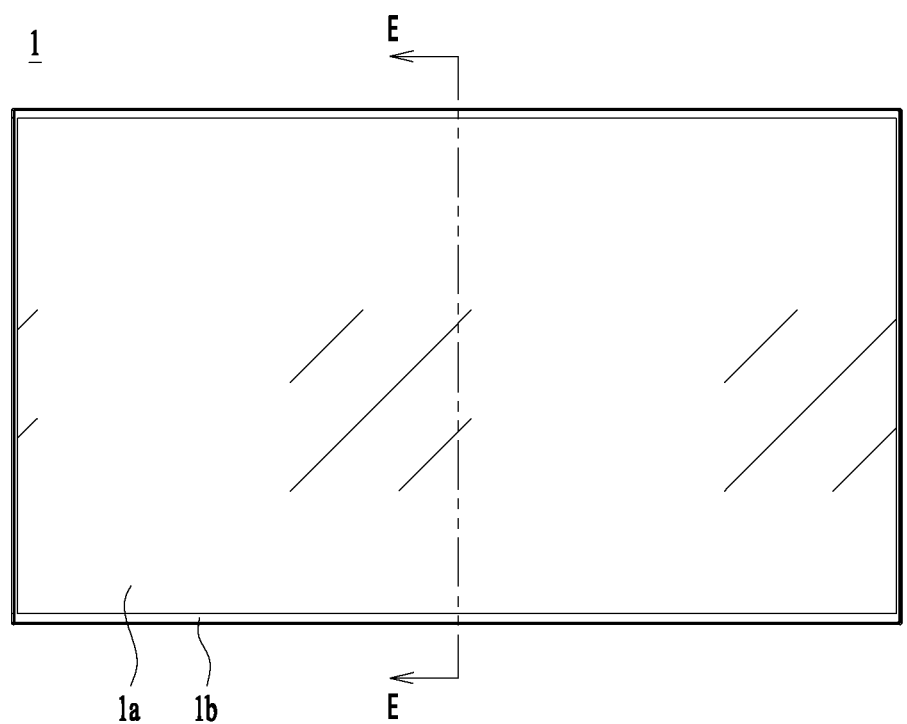
FIG. 9 is a schematic structural diagram of a display device disclosed in yet another embodiment of the present disclosure.
Figure 10:
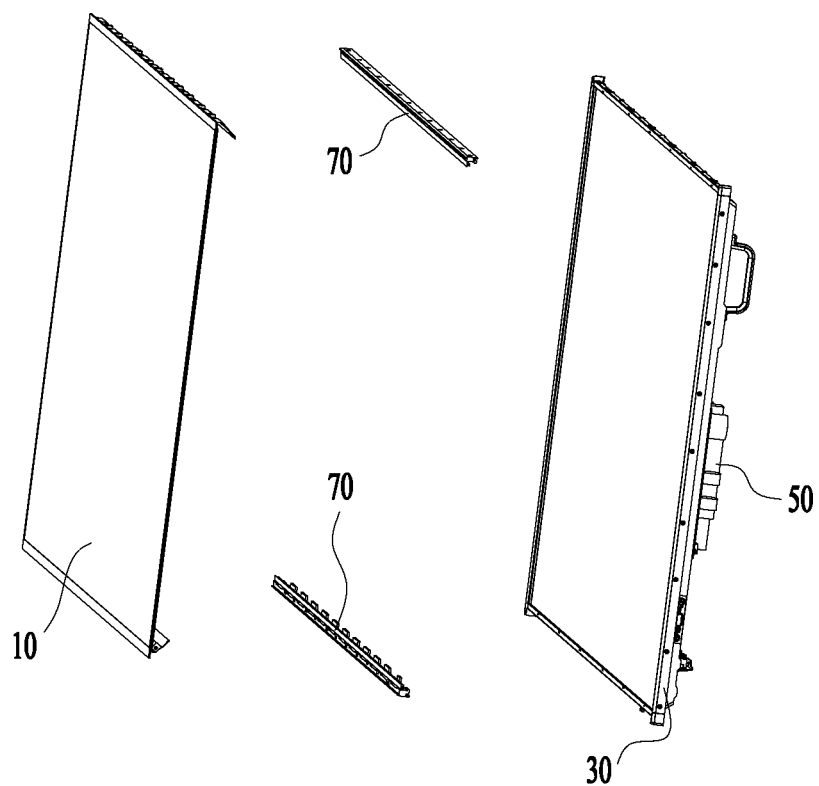
FIG. 10 is a schematic exploded structural diagram of the display device of the embodiment shown in FIG. 9.
Figure 11:
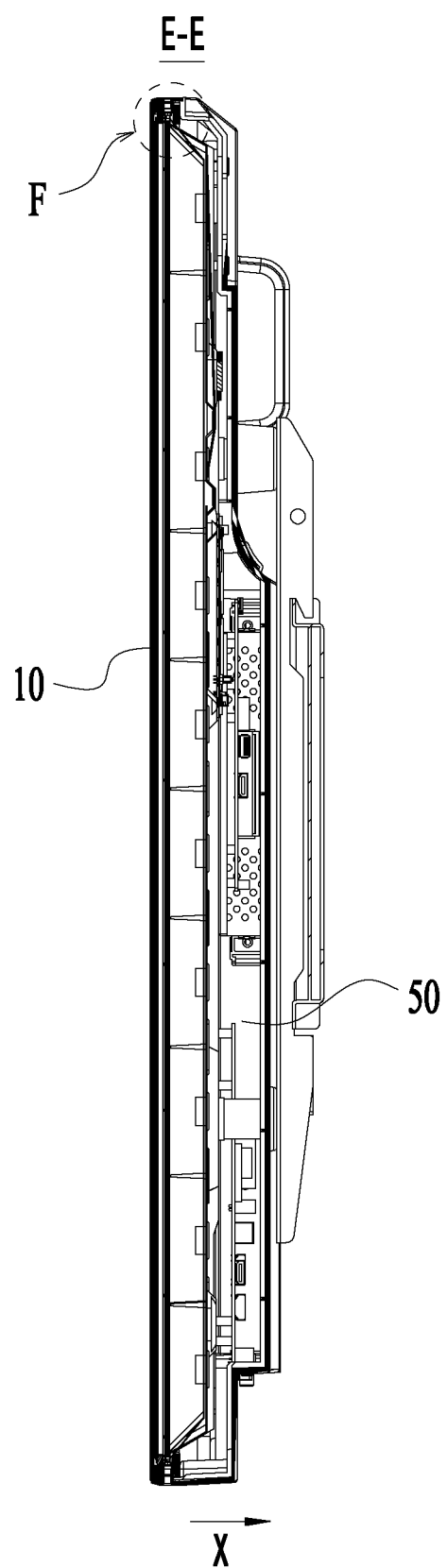
FIG. 11 is a schematic sectional structural diagram taken along an E-E direction in FIG. 9.
Figure 12:
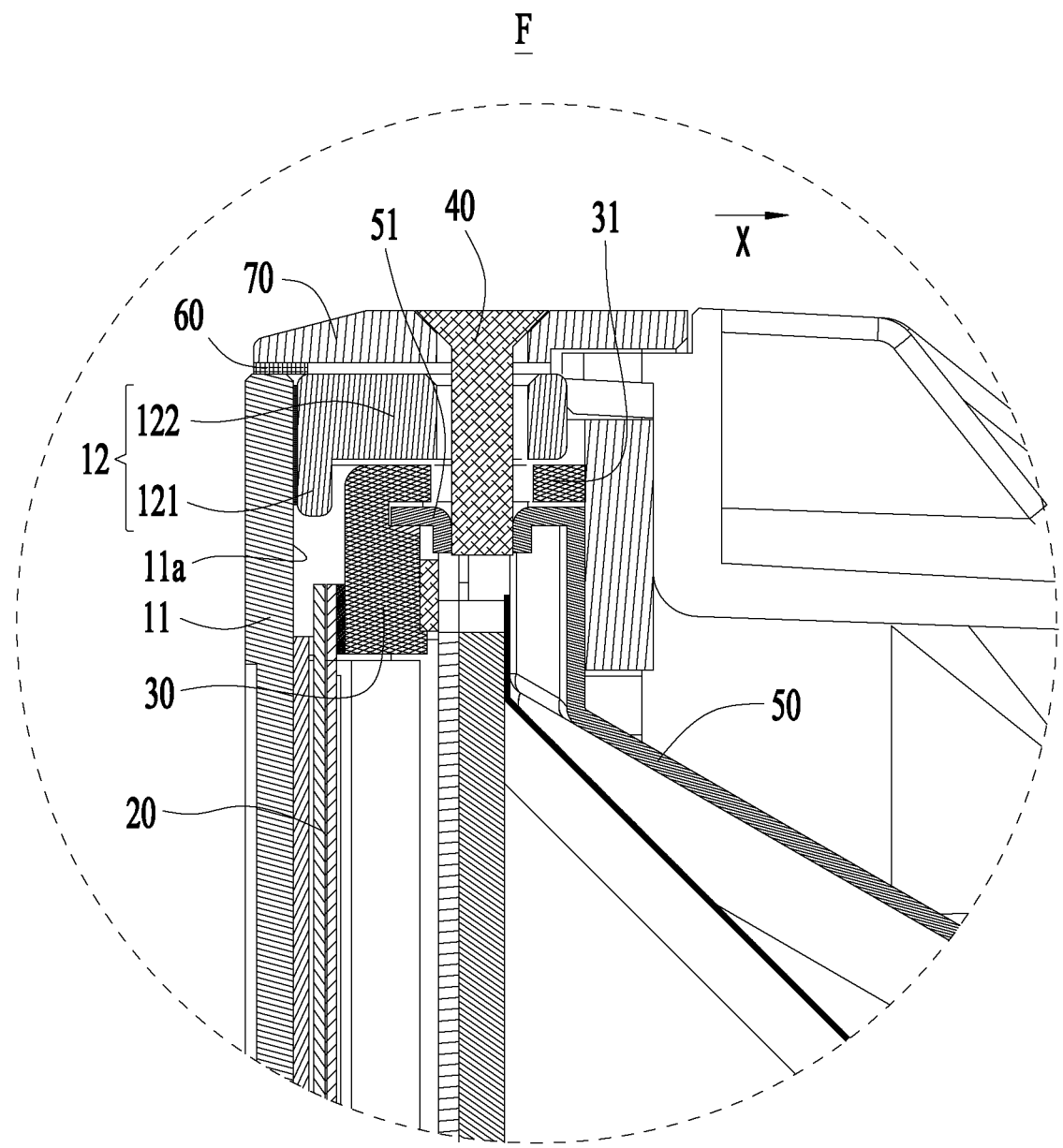
FIG. 12 is an enlarged schematic diagram of a part F in FIG. 11.

FIG. 9 schematically shows a front structure of the display device 1 according to another embodiment of the present disclosure. FIG. 10 schematically shows an exploded structure of the display device 1 of the embodiment shown in FIG. 9. FIG. 11 schematically shows a sectional structure taken along an E-E direction in FIG. 9. FIG. 12 schematically shows an enlarged diagram of a part F in FIG. 11.

In an embodiment, referring to FIG. 9 and FIG. 10, a structure in this embodiment that is the same as the embodiment shown in FIG. 8 will not be repeated. Differences are mainly described in this embodiment. The display device 1 of this embodiment further includes two outer frame assemblies 70 disposed oppositely. The two outer frame assemblies 70 and the middle frame assembly 30 are independently disposed and used in cooperation with the middle frame assembly 30.

Referring to FIG. 11 and FIG. 12, the adapter 12 of this embodiment includes the connecting portion 121 and the cantilever portion 122. The cantilever portion 122 is disposed on the edge of the connecting portion 121 away from the display panel 20. The cantilever portion 122 is folded toward the middle frame assembly 30 relative to the connecting portion 121 and is located outside the middle frame assembly 30. The outside of the middle frame assembly 30 refers to the side of the middle frame assembly 30 away from a central area of the display device 1. The cantilever portion 122 can limit the middle frame assembly 30 on the outside of the middle frame assembly 30. The adapter 12 of this embodiment can be disposed at a position close to the edge of the cover plate 11. A surface of the cantilever portion 122 away from the middle frame assembly 30 may be flush with a narrow surface of the cover plate 11. The narrow surface of the cover plate 11 is adjacent to the side surface 11a. In this way, the adapter 12 occupy an area closer to the edge of the cover plate 11, so that a width of the screen printing ink can be further reduced to increase an area of the display area 1a. In an example, referring to FIG. 12, a cross-section of the adapter 12 may be L-shaped. The outer frame assemblies 70 are located on the outside of the cantilever portion 122, and the flexible sealing pad 60 is disposed between the outer frame assemblies 70 and the cover plate 11, which is beneficial to reduce a possibility of external substances (such as dust or water vapor) entering an interior of the display device 1 from between the outer frame assemblies 70 and the cover plate 11. In an example, the outer frame assemblies 70 overlap the narrow surface of the cover plate 11. The flexible sealing pad 60 is located between the narrow surface of the cover plate 11 and the outer frame assemblies 70.

In an embodiment, continuing to refer to FIG. 12, the middle frame assembly 30 includes a first extension portion 31 located inside the cantilever portion 122. The backlight assembly 50 has a second extension portion 51 located inside the first extension portion 31. At least part of the first extension portion 31 is located between the cantilever portion 122 and the second extension portion 51. The fastener 40 locks the cantilever portion 122, the first extension portion 31 and the second extension portion 51. In an example, both the cantilever portion 122 and the first extension portion 31 include through holes, and the second extension portion 51 is provided with threaded holes corresponding to the through holes. The rod of the fastener 40 passes through the through holes of the cantilever portion 122 and the first extension portion 31 and is threadedly connected to the threaded hole. In another example, the outer frame assembly 70 is also provided with a through hole, and the fastener 40 passes through the through hole of the outer frame assembly 70, the cantilever portion 122, and the first extension portion 31 and is threaded with the threaded hole of the second extension portion 51, so that the fastener 40 locks the outer frame assembly 70, the cantilever portion 122, the first extension portion 31 and the second extension portion 51. In an example, the through hole on the cantilever portion 122 is a waist-shaped hole, so that a position error can be compensated, and a difficulty of aligning the through hole on the cantilever portion 122 and the through hole on the middle frame assembly 30 with each other and a position accuracy requirement are reduced. The fastener 40 can be ensured to pass through the through hole on the cantilever portion 122 smoothly. In an example, the cross section of the middle frame assembly 30 may be L-shaped. A buffer foam is disposed between the middle frame assembly 30 and the display panel 20 to prevent dust or moisture from entering between the display panel 20 and the backlight assembly 50.

In the display device 1 of the embodiment of the present disclosure, more than two adapters 12 are provided on the cover plate 11 so that the middle frame assembly 30 can be connected to the cover 10 via the adapters 12. More than two adapters 12 are disposed on an edge area of the cover plate 11 beyond the display panel 20 and are disposed at intervals along a periphery of the display panel 20. The cover plate 11 and the middle frame assembly 30 are connected and fixed via more than two adapters 12, thereby reducing an connection area between a part of the cover plate 11 corresponding to the non-display area 1b and the middle frame assembly 30, and reducing a constrain on a part of the cover plate 11 corresponding non-display area applied by the middle frame assembly 30. In this way, on the one hand, when there is uneven force applied on a part of the cover plate 11 corresponding to the non-display area 1b, since a part of the cover plate 11 between the two adapters 12 is not restricted, an internal stress of the part the cover plate 11 corresponding to the non-display area 1b can be buffered or released by the unconstrained part, reducing a problem of a crack or deformation of the cover plate 11. On the other hand, when the part of the cover plate 11 located between the two adapters 12 are uneven, a concave part and a convex part are not restricted, so that the internal stress is not likely to be excessively concentrated, and the problem of a crack or deformation of the cover plate 11 is reduced.

An embodiment of the present disclosure also provides a method for manufacturing the display device 1, including:

connecting closely the display panel 20 and the cover plate 11;

along a peripheral direction of the display panel 20, more than two adapters 12 are disposed at intervals on an edge area of the cover plate 11 beyond the display panel 20, and the adapters 12 and the display panel 20 are located on the same side of the cover plate 11;

connecting the middle frame assembly 30 and the adapter 12.

In an embodiment, in the following step that along the peripheral direction of the display panel 20 more than two adapters 12 are disposed at intervals on the edge area of the cover plate 11 beyond the display panel 20 and the adapters 12 and the display panel 20 are located on the same side of the cover plate 11, the adapters 12 are adhered to the edge area.

Although the present disclosure has been described with reference to preferred embodiments, various improvements can be made to it and equivalents can be used to replace components therein without departing from the scope of the present disclosure. Especially as long as there is no structural conflict, all the technical features mentioned in each embodiment can be combined in any way. The present disclosure is not limited to specific embodiments disclosed in the text, but includes all technical solutions falling within the scope of the claims.

What is claimed is:

1. A display device comprising a display area and a non-display area located on a periphery of the display area, the display device comprising:
    a cover comprising a cover plate and adapters, wherein the adapters are disposed on a side surface of the cover plate corresponding to the non-display area, and more than two adapters are disposed at intervals along the periphery of the display area;
    a display panel disposed on the cover plate to correspond to the display area, wherein the display panel and the adapters are located on the same side;
    a middle frame assembly connected to the cover via the adapters, wherein the middle frame assembly and the cover together form an accommodation space to accommodate the display panel,
    wherein the side surface of the cover plate corresponds to the non-display area along a thickness direction of the display device, and the adapters are located between the cover plate and the middle frame assembly along the thickness direction.

2. The display device of claim 1, wherein the display device further comprises a fastener, each of the adapters comprises a connecting portion and a cantilever portion, the connecting portion is connected to the side surface, and the fastener locks the cantilever portion and the middle frame assembly.

3. The display device of claim 2, wherein the cantilever portion extends toward the display panel, and an accommodation gap is formed between the cantilever portion and the cover plate.

4. The display device of claim 3, wherein one of each of the adapters and the middle frame assembly comprises a limiting groove extending along a thickness direction of the cover plate, the other comprises a limiting protrusion extending along the thickness direction of the cover plate, and the limiting protrusion is inserted and fitted into the limiting groove.

5. The display device of claim 3, wherein the display device further comprises a flexible sealing pad disposed between the middle frame assembly and a portion of the cover plate corresponding to the non-display area; or, the display device further includes an outer frame assembly, the adapters are located inside the outer frame assembly, and the flexible sealing pad is disposed between the outer frame assembly and a portion of the cover plate corresponding to the non-display area.

6. The display device of claim 3, wherein the cover plate comprises four frames, two frames opposed to each other form a group of frames, and at least one group of frames is provided with the adapters.

7. The display device of claim 2, wherein the cantilever portion is disposed on an edge of the connecting portion away from the display panel, and the cantilever portion is folded toward the middle frame assembly relative to the connecting portion and is located on an outside of the middle frame assembly.

8. The display device of claim 7, wherein the display device further comprises a backlight assembly connected to the middle frame assembly, the middle frame assembly comprises a first extension portion located inside the cantilever portion, the backlight assembly comprises a second extension portion located inside the first extension portion, and the fastener locks the cantilever portion, the first extension portion and the second extension portion.

9. The display device of claim 8, wherein one of each of the adapters and the middle frame assembly comprises a limiting groove extending along a thickness direction of the cover plate, the other comprises a limiting protrusion extending along the thickness direction of the cover plate, and the limiting protrusion is inserted and fitted into the limiting groove.

10. The display device of claim 8, wherein the display device further comprises a flexible sealing pad disposed between the middle frame assembly and a portion of the cover plate corresponding to the non-display area; or, the display device further includes an outer frame assembly, the adapters are located inside the outer frame assembly, and the flexible sealing pad is disposed between the outer frame assembly and a portion of the cover plate corresponding to the non-display area.

11. The display device of claim 7, wherein one of each of the adapters and the middle frame assembly comprises a limiting groove extending along a thickness direction of the cover plate, the other comprises a limiting protrusion extending along the thickness direction of the cover plate, and the limiting protrusion is inserted and fitted into the limiting groove.

12. The display device of claim 7, wherein the display device further comprises a flexible sealing pad disposed between the middle frame assembly and a portion of the cover plate corresponding to the non-display area; or, the display device further includes an outer frame assembly, the adapters are located inside the outer frame assembly, and the flexible sealing pad is disposed between the outer frame assembly and a portion of the cover plate corresponding to the non-display area.

13. The display device of claim 2, wherein one of each of the adapters and the middle frame assembly comprises a limiting groove extending along a thickness direction of the cover plate, the other comprises a limiting protrusion extending along the thickness direction of the cover plate, and the limiting protrusion is inserted and fitted into the limiting groove.

14. The display device of claim 2, wherein the display device further comprises a flexible sealing pad disposed between the middle frame assembly and a portion of the cover plate corresponding to the non-display area; or, the display device further includes an outer frame assembly, the adapters are located inside the outer frame assembly, and the flexible sealing pad is disposed between the outer frame assembly and a portion of the cover plate corresponding to the non-display area.

15. The display device of claim 2, wherein the cover plate comprises four frames, two frames opposed to each other form a group of frames, and at least one group of frames is provided with the adapters.

16. The display device of claim 1, wherein one of each of the adapters and the middle frame assembly comprises a limiting groove extending along a thickness direction of the cover plate, the other comprises a limiting protrusion extending along the thickness direction of the cover plate, and the limiting protrusion is inserted and fitted into the limiting groove.

17. The display device of claim 1, wherein the display device further comprises a flexible sealing pad disposed between the middle frame assembly and a portion of the cover plate corresponding to the non-display area; or, the display device further includes an outer frame assembly, the adapters are located inside the outer frame assembly, and the flexible sealing pad is disposed between the outer frame assembly and a portion of the cover plate corresponding to the non-display area.

18. The display device of claim 1, wherein the cover plate comprises four frames, two frames opposed to each other form a group of frames, and at least one group of frames is provided with the adapters.

19. A method for manufacturing a display device comprising:
   connecting closely a display panel and a cover plate;
   along a peripheral direction of the display panel, more than two adapters are disposed at intervals on an edge area of the cover plate beyond the display panel, and the adapters and the display panel are located on the same side of the cover plate;
   connecting a middle frame assembly and the adapters, wherein the adapters are disposed on a side surface of the cover plate corresponding to a non-display area of the display device, the non-display area is located on a periphery of a display area of the display device, the side surface of the cover plate corresponds to the non-display area along a thickness direction of the display device, and the adapters are located between the cover plate and the middle frame assembly along the thickness direction.

20. The method for manufacturing a display device of claim 19, wherein in the following step that along the peripheral direction of the display panel more than two adapters are disposed at intervals on the edge area of the cover plate beyond the display panel and the adapters and the display panel are located on the same side of the cover plate, the adapters are adhered to the edge area.

* * * * *